(Model.)

4 Sheets—Sheet 1.

E. J. TILLEY.
PLANTING MACHINE.

No. 269,898.  Patented Jan. 2, 1883.

Witnesses.
H. D. Williams
E. H. Baker.

Edward J. Tilley.
Inventor
per Alfred Shedlock
atty.

(Model.)

E. J. TILLEY.
PLANTING MACHINE.

No. 269,898. Patented Jan. 2, 1883.

4 Sheets—Sheet 3.

Witnesses.
H. D. Williams
E. G. Baker

Edward J. Tilley.
Inventor.
per Alfred Sherlock.
Atty.

(Model.)
E. J. TILLEY.
PLANTING MACHINE.
No. 269,898. Patented Jan. 2, 1883.
4 Sheets—Sheet 4.
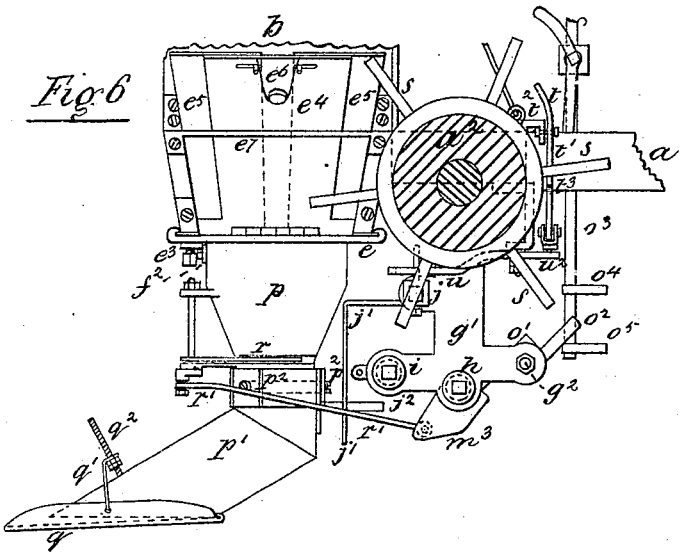
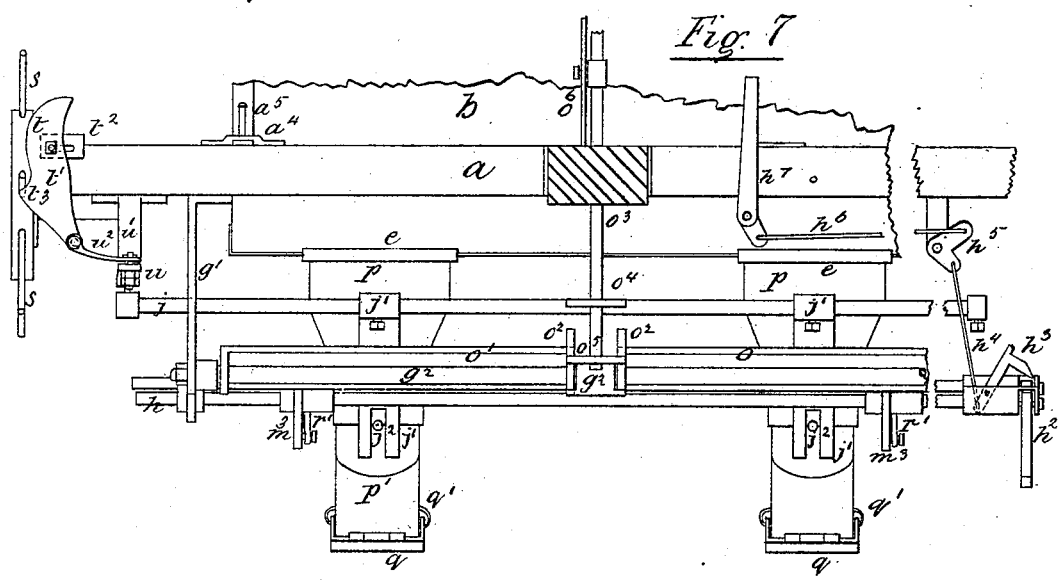
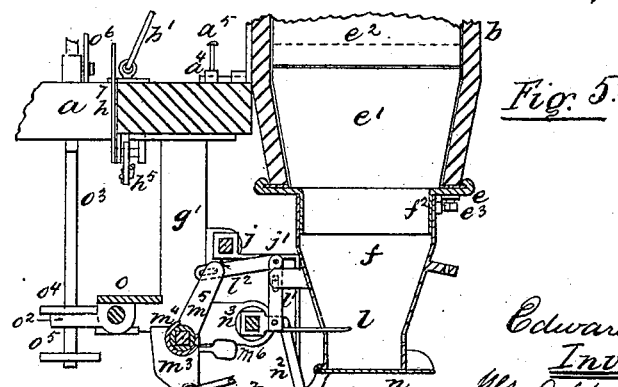
Witnesses.
H. D. Williams
E. L. Baker
Edward J. Tilley.
Inventor.
per Alfred Theobald
Atty.

UNITED STATES PATENT OFFICE.

EDWARD J. TILLEY, OF TOMPKINSVILLE, NEW YORK.

PLANTING-MACHINE.

SPECIFICATION forming part of Letters Patent No. 269,898, dated January 2, 1883.

Application filed September 14, 1881. (Model.)

*To all whom it may concern:*

Be it known that I, EDWARD J. TILLEY, of Tompkinsville, Richmond county, State of New York, have invented certain new and useful Improvements in Planting-Machines, of which the following is a specification.

The planting-machine which forms the subject of this invention is designed to plant seeds, by simple adjustment of its various parts, either in hills, in rows or drills, or in hills and rows or drills at the same time, and also broadcast.

The dropping-spouts are adjustable to and from one another to regulate the spaces between the hills or rows, and they are provided with automatically-acting plates, which, with hinged plates in the hopper, make the connection of the dropping-spouts with the hopper uniformly tight in whatever position they occupy in relation to one another.

The operation and construction of the mechanical devices for regulating the flow of and depositing the various kinds of seeds, and their actuating mechanism, will be fully understood by reference had to the accompanying drawings, forming part of this specification, in which—

Figure 1:
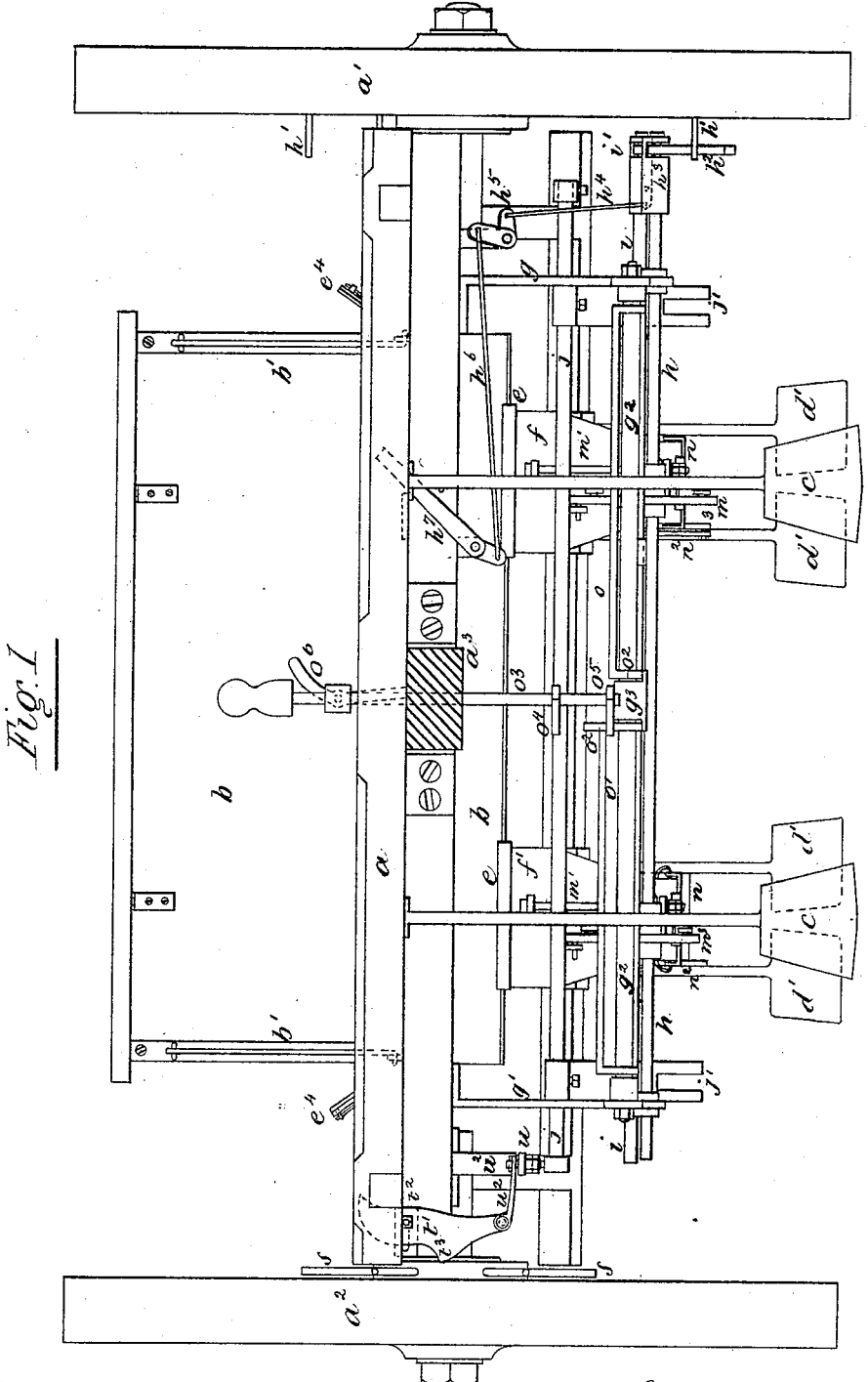
Figure 2:
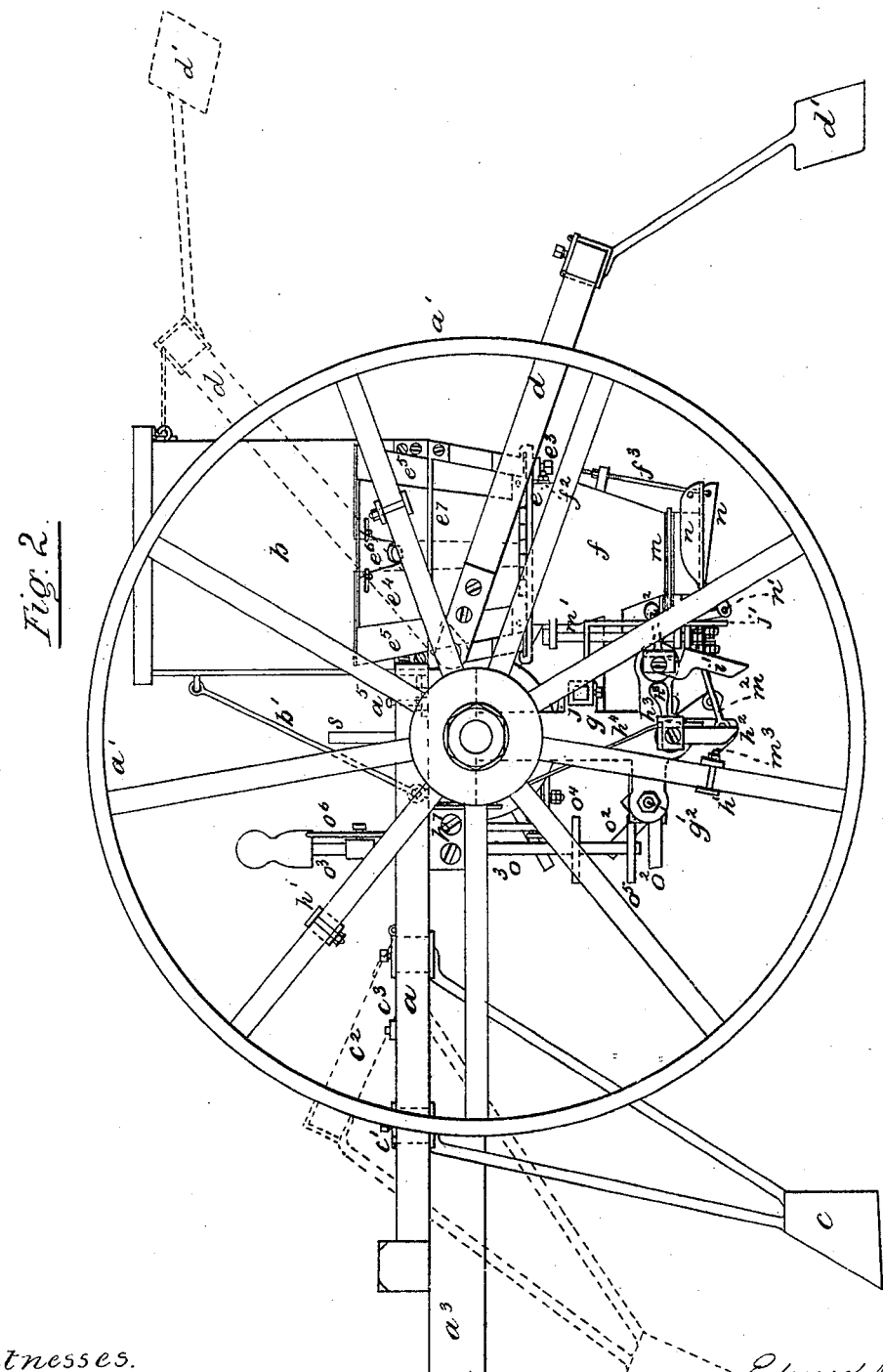
Figure 3:
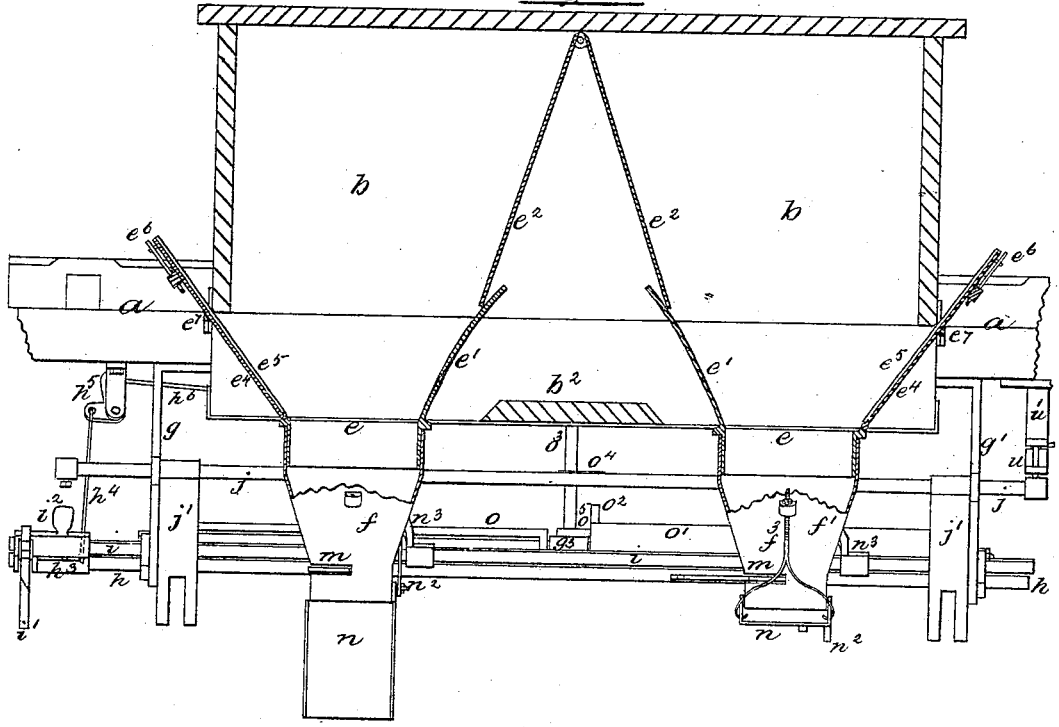
Figure 4:
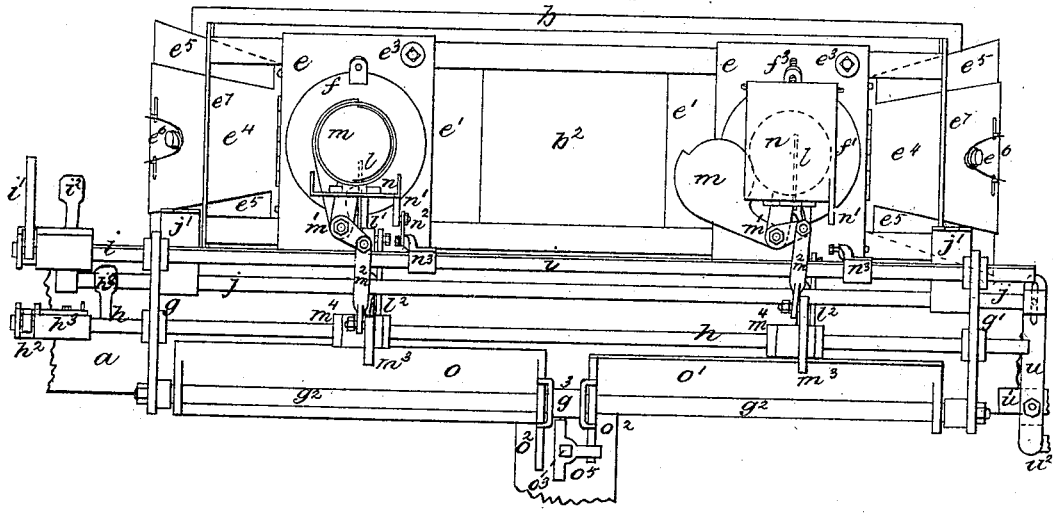

Figure 1, Sheet 1, is a front elevation of the planting-machine embodying my improvements, showing one of the dropping-spouts adjusted to plant seeds in hills and the other adjusted to plant seeds in drills or rows. Fig. 2, Sheet 2, is a side elevation of the same. Fig. 3, Sheet 3, is a rear elevation, partly in section, showing the hill-planting spout in position to discharge the seeds. Fig. 4, Sheet 3, is an underneath view of the same. Fig. 5, Sheet 4, is a sectional view cut through the line $x\ x$. Fig. 6, Sheet 4, is a side elevation of a part of the machine, showing it adjusted to sow seeds broadcast. Fig. 7, Sheet 4, is a front elevation of the same.

The frame $a$ of the machine is supported by the two wheels $a'$ and $a^2$; and $a^3$ represents the draft-pole broken away.

The seed box or hopper $b$ is attached to the frame $a$, just behind the axles of the wheels $a'$ and $a^2$, by means of bracket-irons passing through socket $a^4$, secured to the frame, and held therein by pins or bolts $a^5$. It is further held in place by the brace-rods $b'$, the lower ends of which are provided with hooks and fit into eyes on the frame $a$. By this arrangement the seed box or hopper and the devices connected thereto may be readily removed from the frame to facilitate the storage of the machine, and when it is desired to use the frame and running-gear for other purposes.

In the front of the frame $a$ is hinged an auxiliary frame, to which are fastened the hill or drill markers or formers $c\ c$, said frame being held in place when in use, as shown at Figs. 1 and 2, by a button, $c'$, on each side of the main frame, and held up, as shown by the dotted lines $c^2$, by means of the buttons $c^3$ during the transportation, &c., of the machine.

To the rear of the frame $a$ is hinged the frame $d$, to which are attached the drill or hill closers $d'$. (Shown in position for operating by full lines in Fig. 2, and raised up out of the way by dotted lines, in which position the frame is held by a chain connecting it to the seed-box.) The drill or hill closers $d'$, as well as the markers $c$, are laterally adjustable on their respective frames to enable them to be set in line with the seed-dropping spouts. They may also be readily removed from the machine, and other devices—as rakes, &c.—secured in their places.

The bottom of the seed-hopper $b$ is open except at the central part, where the front and back, which are inclined inwardly at their lower parts, are connected together by the piece $b^2$, and in slides on the bottom are fitted the frames $e\ e$, provided with a central opening having an annular flange on which the dropping-spouts $f$ and $f'$ are secured. The sliding frames $e\ e$ have curved plates $e'\ e'$, extending toward the center of the hopper and fitting into the inclined portions of the back and front, and at the top of the hopper, at its center, are hinged the two flat plates $e^2\ e^2$, the lower edges of which set against the curve plates $e'\ e'$ and remain in contact therewith, forming continuous inclined inner sides to each division of the hopper in whatever position the frames $e\ e$ are placed in the slides at the bottom of the hopper. The plates, when set, are held by the set-screws $e^3\ e^3$. To the outer side of the frames $e\ e$ are hinged the plates $e^4$ $e^4$, somewhat narrower than the width of the bottom of the hopper, and to their lower ends, near where they are hinged to the frames $e\ e$, are pivoted the strips of sheet metal $e^5\ e^5$, adapted to inclose the spaces between the plates $e^4\ e^4$ and the inclined portions of the back and front of the hopper $b$, and these strips $e^5$ $e^5$ are held out against the said inclined portions of the hopper by the springs $e^6$ $e^6$, which are fastened to the hinged plates $e^4$ $e^4$, and the free ends of which bear against studs secured to the sheet-metal strips $e^5$ $e^5$, passing through slots in the plates $e^4$ $e^4$. The hinged plates $e^4$ $e^4$ and pivoted strips $e^5$ $e^5$ are held against the lower edges of the ends of the hopper in line with the commencement of the inclined portions of the front and back by means of the bars $e^7$ $e^7$. By this arrangement it will be seen that when the frames $e$ $e$ are moving to or from the center of the hopper, to regulate the spacing of the seeds sown, all the joints at the bottom of the hopper are kept automatically tight and the sides always inclined to direct the seed to the spouts, besides allowing a much greater quantity of seeds to be carried into the hopper than if separate hoppers were fixed to the tops of the sliding dropping-spout frames.

The seed-dropping spouts $f$ and $f'$ are secured to the annular flanges on the frames $e$ $e$ by the set-screws $f^2$. They are each provided with an agitator, a measuring device, and a dropping-tray, and they are similar in every respect, as shown in Figs. 1 to 4, and operated from the one set of actuating mechanism.

I will first describe the various parts and their adjustment to enable seed to be dropped in hills, as shown in the right-hand-side dropping-spout in Fig. 1, and then describe the adjustment of the parts to enable seeds to be sown in drills or rows, as shown in the left-hand-side spout, Fig. 1, it being understood that both the dropping-tubes may be adjusted to sow in hills or in drills and rows.

From the cross-beam of the frame $a$, to which the axles of the wheels $a'$ and $a^2$ are attached, depend the two bracket-frames $g$ and $g'$, connected together by the tie-rod $g^2$, and in bearings in these frames are fitted the three square rods or shafts $h$, $i$, and $j$. The two lower ones, $h$ and $i$, have round journals, and they are adapted to be oscillated in their bearings, and the upper one, $j$, fits into square holes, and has imparted to it a longitudinal reciprocating motion, as and for the purpose hereinafter explained.

The dropping-spouts $f$ and $f'$ are each provided with an agitator, $l$, measuring-gate $m$, and discharging-tray $n$. The measuring-gate $m$ works through a slot in the dropping-tube, and is located in such position above the discharging tray $n$ that the space contained between them will hold the right quantity of seeds to be dropped in each hill. It is fitted to turn on the short vertical shaft or rod $m'$, attached to the side of the dropping-spout, and is connected by means of the link $m^2$ to the quadrant-shaped plate $m^3$. This quadrant-shaped plate $m^3$ is placed on the sleeve $m^4$, which is fitted on the square shaft $h$ and held by a set-screw, whereby the sleeve may be held in any desired position on the rod $h$. The sleeve $m^4$ is provided with the arm $m^5$, a shoulder on which comes in contact with the upper edge of the plate $m^3$, and so causes the plate $m^3$ and measuring-gate $m$ to move with the square shaft $h$ when the shaft is moved in a left-handed direction; but the plate $m^3$ is free to move independent of the square shaft $h$ by the means of and for the purpose hereinafter described. The agitator is a narrow bar working through a fine vertical slot in the front of the dropping-spout. It is pivoted to the lower end of the lever $l'$, which has a slot in its center working on a fulcrum-stud secured to a bracket projecting from the dropping-spout, and to the upper end of this lever $l'$ is pivoted the link $l^2$, which is connected to the arm $m^5$ by a slot fitting over a stud thereon. The operation of this agitator $l$ is as follows, it lying in its normal position at the bottom of the slot in the dropping-spout and the top of the central slot in lever $l'$ resting on its fulcrum-stud: When the arm $m^5$ moves away from the spout the stud on it comes in contact with the end of the slot in the link $l^2$, and so carries with it the upper end of the lever $l'$, first throwing the lower end of it toward and the agitator $l$ into the spout, and then raising the agitator $l$ upward in the spout by means of the central slot in the lever $l'$ riding over its fulcrum-stud. As the arm $m^5$ moves back toward the spout the link $l^2$ is released, and the lever $l'$, with the agitator, falls down, the agitator being again partly withdrawn from the spout into its normal position by the stud on the arm $m^5$ coming in contact with the other end of the slot of the link $l^2$. The square shaft $h$ is oscillated in the hanging frames $g$ and $g'$ by the pins or studs $h'$, secured to the spokes of the wheel $a'$, coming in contact with the dog $h^2$ (which is pivoted in a block on the end of the square shaft $h$) as the wheel revolves. These pins or studs $h'$ are detachably connected to the spokes of the wheel. Three only are shown in the drawings, so that for every revolution of the wheel the various devices are actuated to drop three hills of seed. It will of course be readily understood how more or less of these studs may be secured to the wheel to plant the hills closer together or farther apart longitudinally. The dog $h^2$ hangs down in a vertical position, and is free to be moved both to the right and left by the studs $h'$ without actuating the square shaft $h$; but it is rigidly connected to the shaft $h$ in direction toward the right (so that the shaft is caused to be oscillated each time any of the studs $h'$ come in contact with the dog $h^2$) by the pivoted catch $h^3$, which works in a groove in the block on the end of the shaft and against the end of which the dog rests. This catch $h^3$ is connected by the flexible rod $h^4$ to the bell-crank lever $h^5$, which, through the medium of the rod $h^6$, is connected to the hand-lever $h^7$; and when this hand-lever $h^7$ is in the position shown in Figs. 1, 2, and 3 the catch $h^3$ is down and the square shaft $h$ and the devices connected thereto are operated as the machine moves along; but when the hand-lever is moved over into the position shown in Fig. 7 the catch $h^3$ is up and the dog $h^2$ is moved by the studs $h'$ without actuating any of the devices connected to the shaft $h$. This last position is the one occupied by the hand-lever $h^7$ when the machine is on the road or when broadcast sowing is being performed by the machine.

The square shaft $i$ is for actuating the delivery-trays $n$, and it is also provided with a hanging dog, $i'$, free to move in one direction only without moving the shaft $i$—viz., toward the left—so that when the machine is being backed the studs $h'$ pass by both of the dogs $i'$ and $h^2$ without actuating any of the mechanism; but when the machine is moving forward, then the studs $h'$ move the square shaft $i$ immediately after moving the square shaft $h$, and so cause the delivery-tray $n$ to drop down, as shown at Figs. 3 and 4, and deposit the seeds which have been allowed to pass by the measuring-gate $m$. The delivery-tray $n$ is hinged to the front part of the bottom of the dropping-spout, and an arm, $n'$, on it is connected by the rod $n^2$ to the crank-arm $n^3$, secured to the square shaft $i$ by a set-screw, and by means of which this crank-arm may be set and secured to any part of square shaft, according to the position occupied by the dropping-spout. The square shafts $h$ and $i$ are provided respectively with weighted arms $h^8$ and $i^2$, by means of which they are brought to their normal positions after being operated by the studs $h'$, and the weights $m^6$ are cast on the quadrant-plates $m^3$ to close the gates $m$. Springs may be substituted for these weights, if desired.

To convert the machine into a drill or a row planter, the connection or connections between the delivery tray or trays $n$ and square shaft $i$ is or are broken by removing the rod or rods $n^2$, according to whether it is desired to plant in drills from one or both dropping-spouts. The delivery-tray of the dropping-spout $f'$ is shown so adjusted, and it is held in the desired position to leave a sufficient opening between it and the bottom of the spout to allow the seeds to gradually and continuously discharge from the trays by means of the wire yoke $f^3$, the forked ends of which are hooked into holes in the side of the tray $n$, and the upper end passes through a stud on the rear of the spout, and has on it a nut, by means of which the space between the bottom edge of the spout and the tray is regulated. When the machine is so adjusted it is not necessary that the measuring-gate $m$ should be worked, but that it be held open all the time. To accomplish this I hinge on the tie-rod $g^2$ the two flat plates $o$ and $o'$, which rest in their normal positions on the upper edge of the quadrant-shaped plates $m^3$ $m^3$, and their ends at the center of the machine are provided with the arms $o^2$, and they are separated by the block $g^3$, secured to the tie-rod, and which is provided with lugs arranged to control the extent of movement of the plates $o$ and $o'$. Located between the arms $o^2$ of the plates $o$ and $o'$ is the vertical rod $o^3$, which passes up through a central hole in the frame $a$, and has a knob on its upper end in handy position to the driver, who sits upon the seed-box $c$. At the lower end of this rod $o^3$ are two sets of arms, $o^4$ and $o^5$, arranged thereon so that one set, $o^4$, is above and the other set, $o^5$, below the arms $o^2$. Each set comprises three radial arms, occupying three quadrate positions on the rod $o^3$, so that by turning the rod $o^3$ into the position shown in Figs. 1 to 4 the arm $o^2$ of the plate $o'$ is raised up and the plate $o'$ depressed, thereby acting on the upper edge of the quadrant-plate $m^3$, and holding the measuring-gate $m$ open, allowing the seeds to pass freely on the tray $n$ of the dropping-spout $f'$, from which the seeds are discharged in a steady current, regulated as before described. The rod $o^3$ is held up in this position by means of the retaining-lever $o^6$, pivoted to a block on the rod, and which is placed, as shown in Fig. 1, so that the end of its long arm rests on the upper surface of the frame $a$.

When it is desired to stop the flow of seeds from the spout $f'$ the lever $o^6$ is released, the rod $o^3$ falls down, as shown in Fig. 5, the plate $o'$ rises up, the quadrant-plate $m^3$ moves back, and the gate $m$ is thereby allowed to close, the center one of the upper arms, $o^5$, of the rod $o^3$ insuring the rising of the plate $o'$ by coming in contact with the arm $o^2$ as the rod falls. By turning the rod $o^3$ one-half of a revolution the plate $o$ is operated, and the plate $o'$ remains inoperative when the rod is raised, and by turning it at right angles both the plates $o$ and $o'$ are acted upon to open the measuring-gates $m$ of both the dropping-spouts. It is shown in this last position in Figs. 6 and 7, which illustrate the machine adjusted to sow seeds broadcast. The hand-lever $h^7$ is also moved over to disengage the catch $h^3$ from the dog $h^2$, so that the studs $h'$ pass by it without actuating the square shaft $h$. The dropping-spouts $f$ and $f'$ are removed from the frames $e$ and replaced by the spouts $p$ $p$. The lower ends, $p'$ $p'$, of these spouts are formed at an angle, so as to extend some distance from the center of the spouts at the rear of the machine, and they are connected to the parts $p$ $p$ by the set-screws $p^2$, which project inwardly in grooves formed in the parts of the spouts $p$ $p$ which fit into the upper ends of the parts $p'$. The parts of the spouts are thereby held together; but the lower parts, $p'$, are free to be vibrated or oscillated in horizontal planes. The lower ends of the parts $p'$ are covered by the hinged trays $q$, which are held up by the yokes $q'$, fitted over the threaded studs $q^2$, projecting upwardly from the movable parts of the spouts $p'$, and nuts are placed thereon to regulate the opening between the trays $q$ and mouths of the spouts.

The gates $r$ $r$ are connected to move through slots in the fixed parts $p$ $p$ of the spouts in a similar manner to the gates $m$ on the spouts $f$ and $f'$; but on the opposite sides of the spouts they are connected to the quadrant-plates $m^3$ by means of the links $r'$.

To impart the vibratory oscillating motion to the discharging ends of the spouts $p'$ $p'$, radial pins $s$ $s$ are secured to the hub of the supporting-wheel $a^2$, which strike against the part $t$ of the cam-shaped lever $t'$, which is pivoted on the stud-bolt fitted in a slot in the bracket $t^2$ on the frame $a$, and so moves the lever $t'$ in one direction, and then strikes against the projection $t^3$ to move it in the other direction. The lower end of the lever $t'$ is connected to the lever $u$, pivoted to the bracket $u'$ on the frame $a$ by the link $u^2$, and the other end of this lever $u$ imparts a longitudinal reciprocating movement to the square rod or shaft $j$ by means of a slot in its end fitting over a pin in the shaft $j$. Clamped to this shaft $j$ are the two forked arms $j'$, adjusted thereon to embrace the studs $j^2$, projecting from the front side of the movable parts $p'$ of the spout. By this arrangement of levers, &c., it will be seen that the delivery ends of the spouts are caused to move sidewise on the fixed parts of the spouts as the machine travels over the ground, and so scatter the seeds as they leave the spouts; and when it is desired to throw the broadcast arrangement out of gear the stud-bolt on which the cam-lever $t'$ rocks is moved to the other end of the slot in the bracket $t^2$, so that the radial pins $s$ pass by without operating it, and the forked arms $j'$ are slid along the square shaft $j$ to near its ends, when the machine is adjusted to sow seeds in hills or rows and drills to be out of the way, as shown in Figs. 1 to 4.

I would state that the broadcast planting arrangement here shown as being particularly adapted to be used with other mechanical devices is not here claimed, as it will form the subject of another application.

It is obvious that the several parts of the machine may be modified in form without departing from the nature of my invention, and be used independent of the other devices or parts, as described, so I do not wish to confine myself to the particular construction and arrangement of the parts shown; but

What I claim as new, and desire to secure by Letters Patent, is—

1. In a seed-planter, the spout-holding frame adapted to slide along the bottom of the seed-hopper, and provided with a curved plate, in combination with a hanging plate hinged at the upper part of the hopper, and arranged to lie against the curved plate, substantially as and for the purpose set forth.

2. The combination, with the sliding spout-holding frame of a seed-hopper, of a hinged plate provided with pivoted side strips, and springs adapted to press the side strips against the inclined parts of the front and back of the hopper, and thereby automatically maintain tight joints at the ends of the hopper as the spout-holding frame is adjusted in different positions, substantially as hereinbefore set forth.

3. In a seed-planter, in combination, a spout-holding-frame adapted to be moved along the bottom of the seed-hopper, and having a curved plate connected thereto, a hinged plate in the hopper resting against the curved plate, a plate hinged to the spout-holding frame at the opposite side to the curved plate, spring-acting strips pivoted to this hinged plate, and the hopper-body, the front and back of which are inclined inwardly at their lower parts, substantially as and for the purpose set forth.

4. In combination, the seed-dropping spout $f$, the agitator $l$, and measuring-gate $m$, connected to and operated by the square shaft $h$, and the delivery-tray $n$, connected to and operated by the shaft $i$, said shafts $h$ and $i$ actuated to alternately oscillate by means of studs $h'$, secured to the spokes of the wheel, substantially as hereinbefore set forth.

5. In combination, wheel-spoke stud $h'$, dog $h^2$, square shaft $h$, catch $h^3$, hand-lever $h^7$, and connecting-rods $h^4 h^6$, substantially as set forth.

6. In combination, the oscillating shaft $h$, sleeve $m^4$, quadrant-plate $m^3$, link $m^2$, and measuring-gate $m$, substantially as set forth.

7. In combination, the oscillating shaft $h$, sleeve $m^4$, quadrant-plate $m^3$, link $m^2$, measuring-gate $m$, plate $o$, and rod $o^3$, provided with arms $o^4$ and $o^5$, substantially as and for the purpose set forth.

8. The dropping-spouts $f$ and $f'$, their measuring-gates $m$, operating-shaft $h$, and quadrant-plates $m^3$, in combination with the plates $o$ and $o'$, provided with arms $o^2$, and rod $o^3$, having arms $o^4$ and $o^5$ and retaining-lever $o^6$, substantially as and for the purpose set forth.

9. In combination, the studs $h'$, dog $i'$, shaft $i$, crank-arm $n^3$, link or rod $n^2$, and delivery-tray $n$, substantially as set forth.

10. In combination, the agitator $l$, lever $l'$, link $l^2$, sleeve and arm $m^4$ and $m^5$, square shaft $h$, dog $h^2$, and actuating-studs $h'$, substantially as set forth.

11. In combination, the agitator $l$, lever $l'$, link $l^2$, sleeve and arm $m^4$ and $m^5$, quadrant-plate $m^3$, link $m^2$, and measuring-gate $m$, substantially as set forth.

12. In combination, the rod $o^3$, plate $o'$, quadrant-plate $m^3$, link $m^2$, measuring-gate $m$, spout $f$, hinged delivery-tray $n$, and adjusting-yoke $f^3$, substantially as set forth.

13. In a seed-planter, the adjustable dropping-spouts $f$ and $f'$, each provided with an agitator, a measuring-gate, and a hinged delivery-tray, in combination with the square shafts $h$ and $i$, the adjustable sleeve $m^3$, and adjustable crank-arms $n^3$ and their connecting links and levers, substantially as and for the purpose set forth.

In witness whereof I have hereunto set my hand, at New York, county and State of New York, this 12th day of September, A. D. 1881.

EDWARD J. TILLEY.

Witnesses:
ALFRED SHEDLOCK,
ERNEST G. BAKER.